Figure 1:
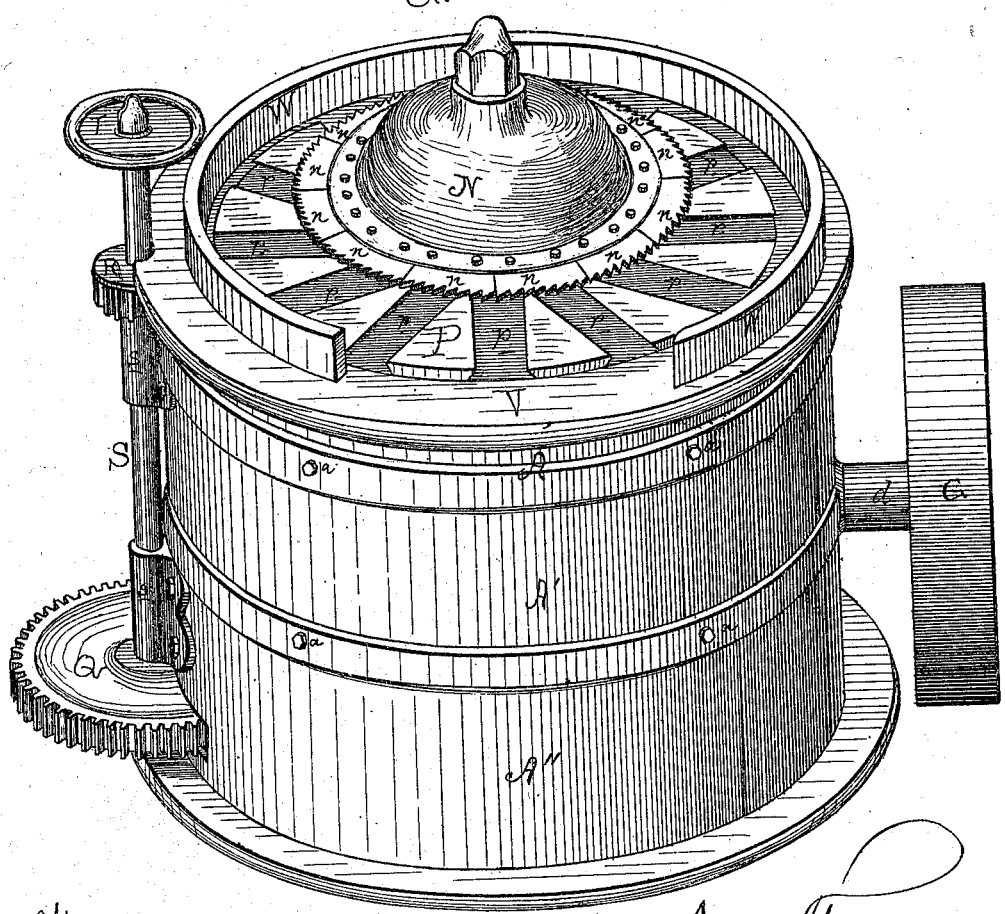

4 Sheets—Sheet 1.

J. FASSLER.
MACHINE FOR SAWING SLOTS IN HARVESTER GUARD FINGERS.

No. 105,323. Patented July 12, 1870.

4 Sheets—Sheet 2.
J. FASSLER.
MACHINE FOR SAWING SLOTS IN HARVESTER GUARD FINGERS.
No. 105,323. Patented July 12, 1870.
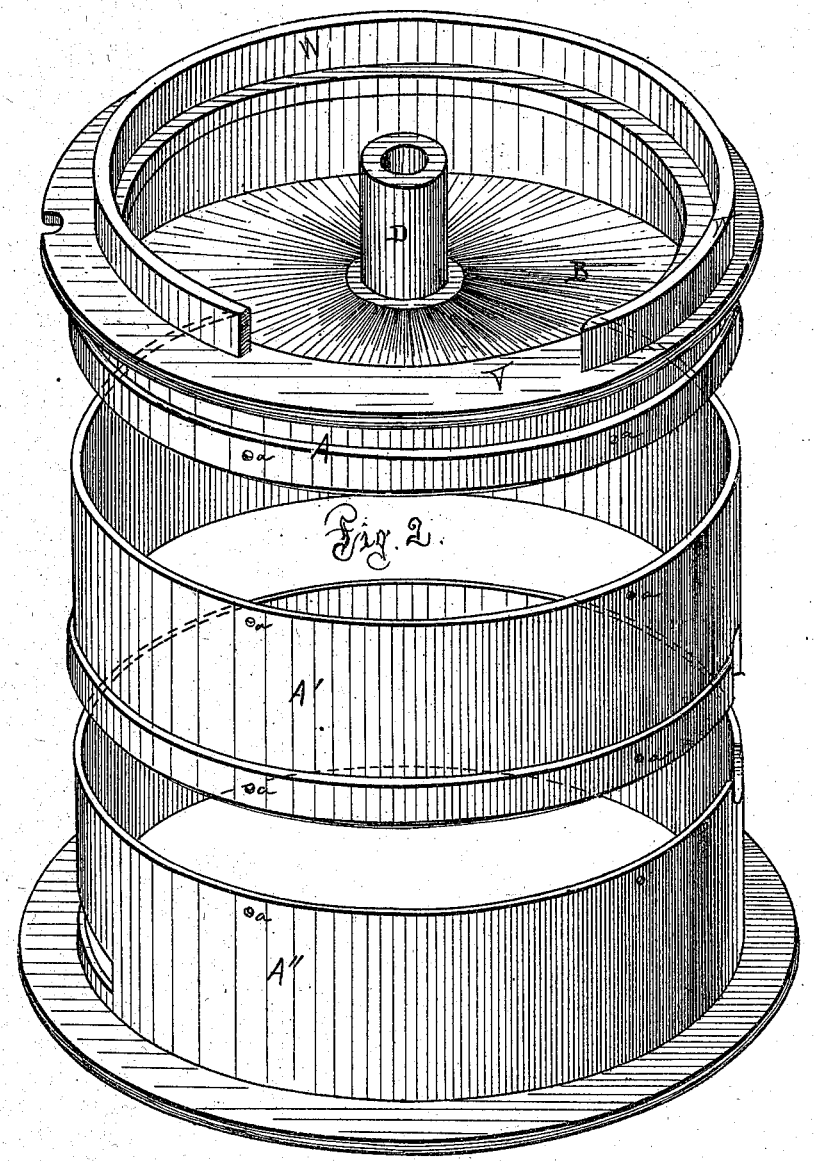
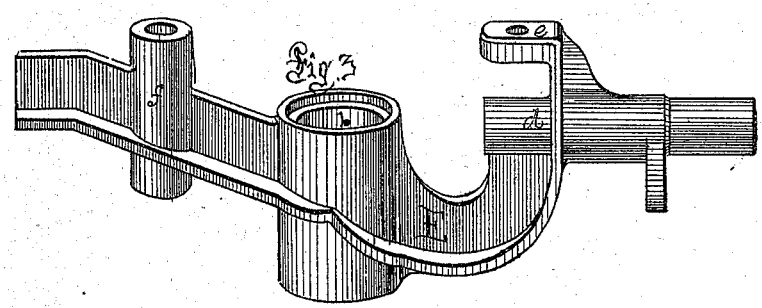

J. FASSLER.
MACHINE FOR SAWING SLOTS IN HARVESTER GUARD FINGERS.
No. 105,323. Patented July 12, 1870.
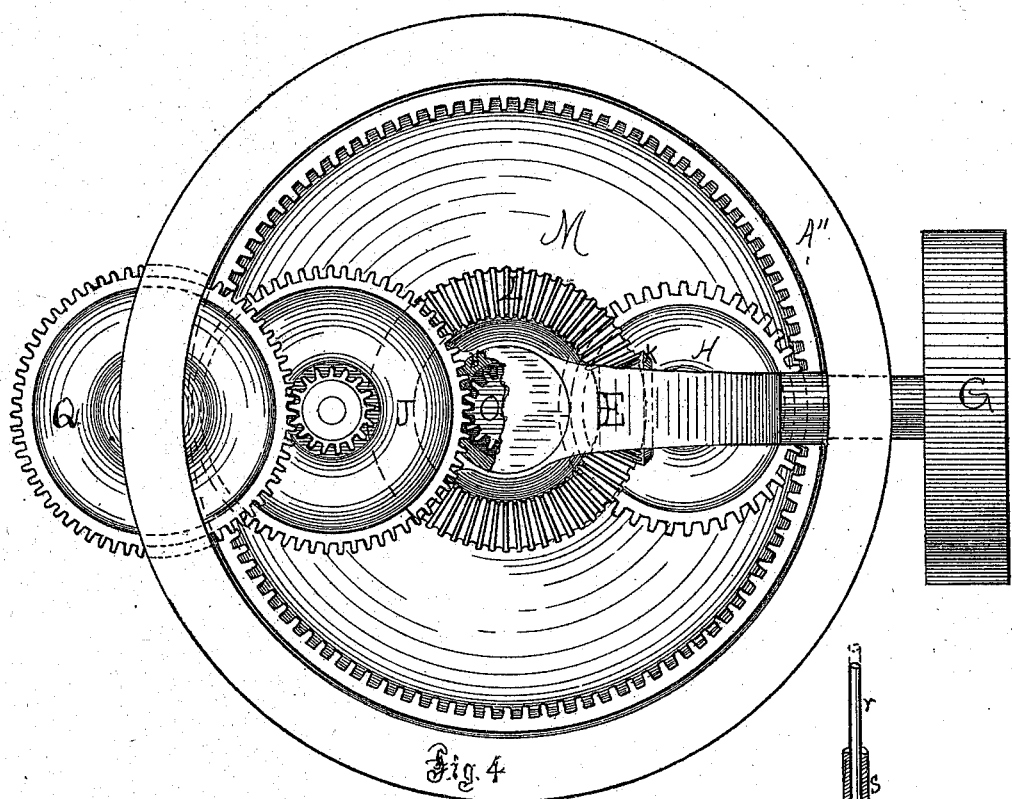
Fig. 4.
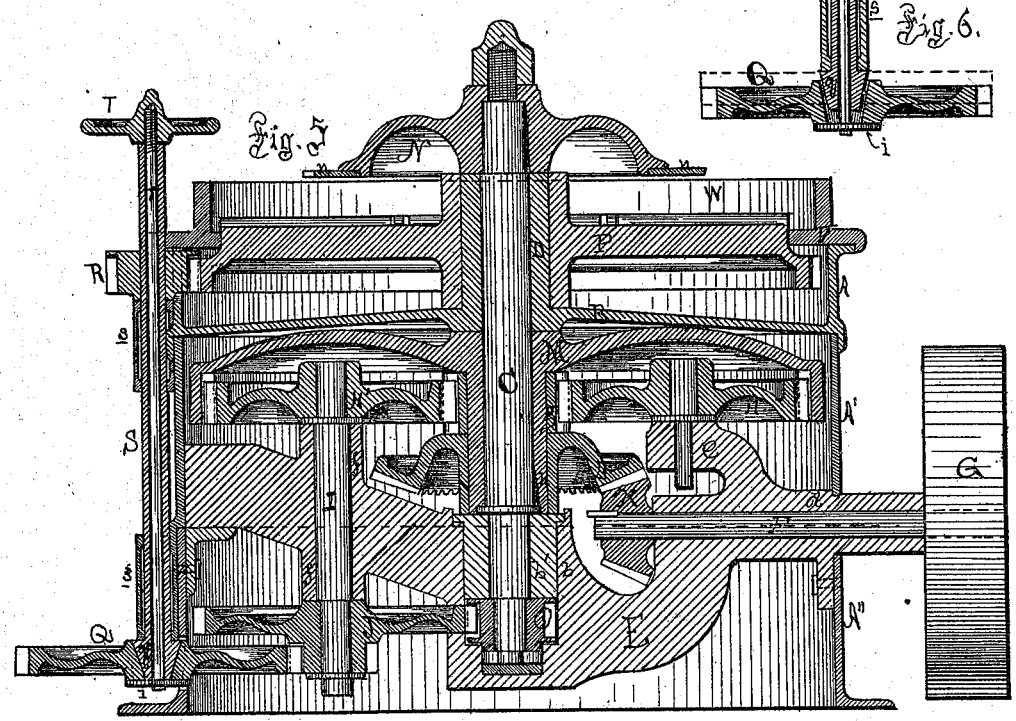

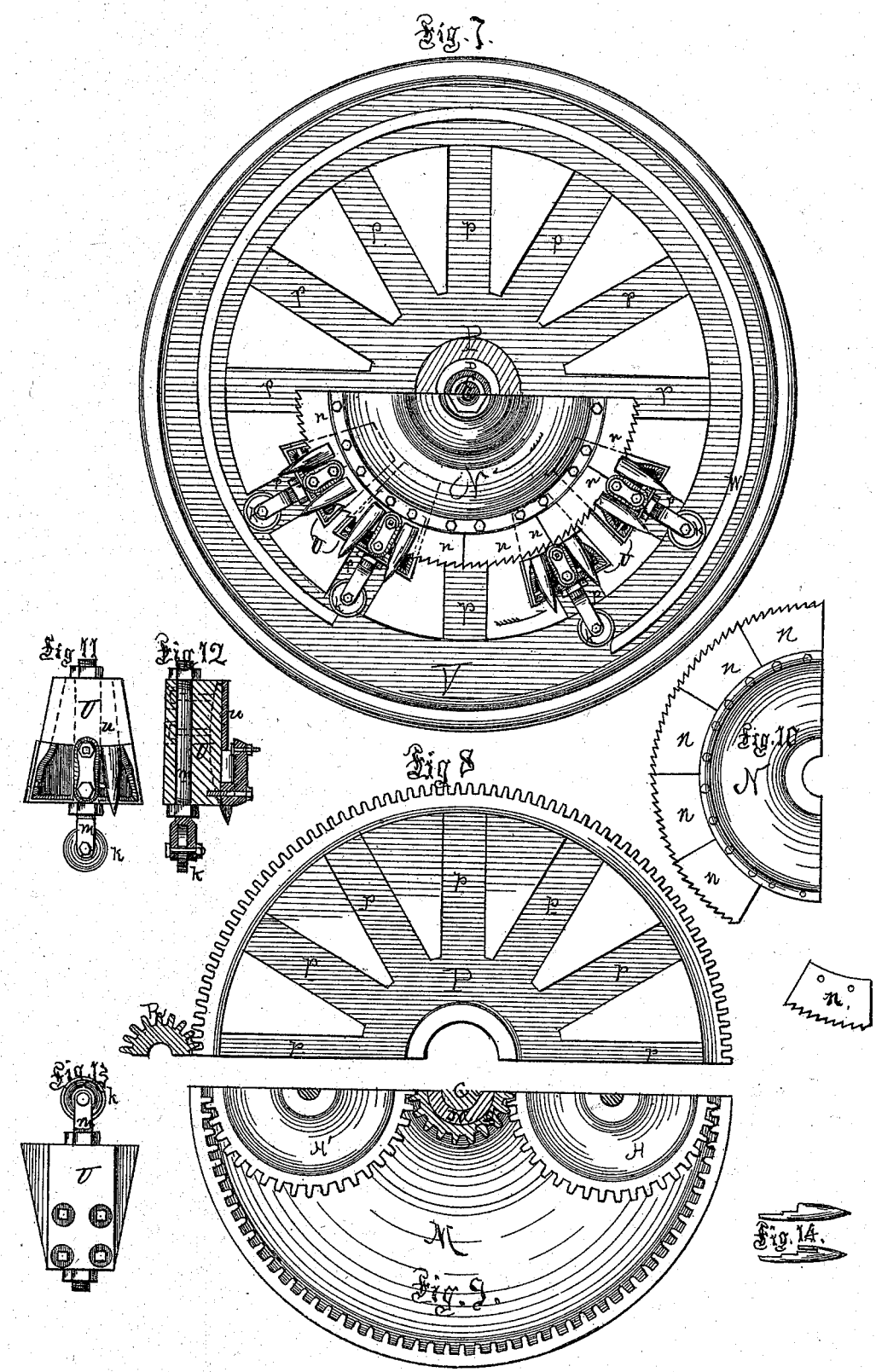

UNITED STATES PATENT OFFICE.

JEROME FASSLER, OF SPRINGFIELD, OHIO.

IMPROVEMENT IN MACHINES FOR SAWING THE SLOT IN HARVESTER GUARD-FINGERS.

Specification forming part of Letters Patent No. 105,323, dated July 12, 1870.

*To all whom it may concern:*

Be it known that I, JEROME FASSLER, of Springfield, in the county of Clarke and State of Ohio, have invented a new and useful Improvement in Machines for Making Harvester Guard-Fingers; and I do hereby declare the following to be a full, clear, and exact description of the same, reference being had to the accompanying drawing, in which—

Figure 1 is a perspective view of my machine. Fig. 2 is a perspective view of the case for the same, with the parts detached. Fig. 3 is a perspective view of principal bearing-bar for the same. Fig. 4 is an internal plan, showing the train. Fig. 5 is a vertical central section of the machine. Fig. 6 is a detached sectional elevation of clamping device for feed-gear. Fig. 7 is a plan of table, showing in section, on side, the saw and finger-holders in place; Fig. 8, half-plan of table with feed-gear; Fig. 9, bottom plan of great wheel and planet-wheels; Fig. 10, half-plan, showing construction of saw; Figs. 11, 12, and 13, top, section, and bottom of finger-holder. Fig. 14, blank finger and slotted finger.

My invention relates to machinery for forming the slots in guard-fingers for harvesting-machines, by sawing or milling the same; and it consists, first, in arranging a series of guard-finger holders at intervals around the periphery of a circular saw, with mechanism to rotate said saw, and to feed the guard-fingers and their holders simultaneously toward the teeth of the saw; second, in arranging the mechanism so that the guard-fingers will be fed in while traversing a scroll or spiral line toward the center of the saw; third, in the arrangement of a table to carry the guard-finger holders around the saw in a direction opposite to its rotation; fourth, in an automatic successive release of the guard-finger holders, so that they can be removed and others put in their place while the machine continues in motion; fifth, in the arrangement and disposition of the gearing by means of which motion is given to the operative parts of the machinery; sixth, in the general construction and arrangement of the case or frame of the machine.

I am aware that harvester guard-fingers have been slotted by means of saws or milling tools and by reciprocating saws; but so far as I am aware, in all machines hitherto devised for this purpose, the process has included one general feature, *i. e.*, intermittence—that is, the blanks are always presented and fed up in a straight line, and backed out to be removed.

In all these devices, also, the blanks have been presented from one single direction, and the friction upon the saw-bearings has consequently been indefinitely increased. In all these machines, also, the time required to back out the blank and replace it with another is lost time, as the machine then does no work.

In my machine there is no intermittence of operation. While in operation the cutter is always at work. The blanks are presented from all directions, and the pressure upon the saw on one side is balanced by an equal pressure upon the other, so that no extra friction is thrown upon the arbor, but all the friction relative to the saw is converted into work. The blanks are fed in while traversing a spiral line, in opposition to the motion of the saw, and the finger may therefore, after traveling entirely around the saw, be removed at the same point where it had been introduced. While one finger is being removed and a blank is being put in its place, the saw will be still operating upon a large number of other fingers.

Having now set forth the general nature of my invention, I will particularly describe its construction and operation.

The guard-fingers, before being slotted, may properly be called "blanks;" but for convenience I shall hereinafter denominate them "fingers," whether slotted or solid.

The casing and supporting-frame of the machine consists of a series of broad rings, A A' A", properly fitted together at their edges, and provided with such openings as are necessary for the passage of shafts, &c. By means of this case the mechanism of the apparatus is not only securely held in proper working position, but it is also inclosed and protected from dust and such other disturbing causes which might impair its operation. The ring A" is provided at its lower edge with a broad lateral flange, to give it a firm seat upon the floor, and to afford convenient means of attachment thereto. The upper ring, A, is formed with a diaphragm or partition, B, extending entirely across it, and only perforated at its center to permit the main shaft C to pass through, and to make a bearing for said shaft at its upper end. The hub D is also made upon said diaphragm. The sections A A' A'' are bolted together by bolts or screws through their overlapping edges, as at $a\ a$.

The main bearing-bar E is securely bolted to the inner surface of the lower ring, A'', crossing the axis of said ring. This bearing-bar contains or supports the bearings of the various moving parts of the train, as will now be fully described. At the center of said bar is a hollow cylindrical step, $b$, to receive and support the main shaft C. At the right-hand end of said bar, Fig. 3, is a long hollow box, $d$, for the primary driving-shaft F.

The box $d$ projects through the casing A'' far enough to admit free room for the main driving-pulley G to set close up to the end of the box. Above the box $d$ is an angle-lug, $e$, upon which is mounted the first gear-wheel, H, and at the left-hand part of the beam E there is formed a vertical box, $f$, through which is placed a stationary shaft, I, upon the upper end of which is mounted the second gear-wheel, H', and upon the lower end the center reducing wheel and pinion J of the feed-train.

The main shaft C has its lower bearing in the step $b$, and its upper bearing in the hub D. The primary shaft F receives its motion through the pulley G, at its outer end, or some equivalent means of connection with the prime motor. At the inner end of said shaft there is a bevel-wheel, which meshes with a corresponding wheel, L. This latter wheel L has a large hollow hub concentric to the main shaft C, but not in contact therewith, as the hub of the great wheel M lies between. The shaft C is keyed fast to the hub of the great wheel M, or they are forced to revolve together by a feather, as at $h$, Fig. 5.

At the upper end of the main shaft C the slotting-saw N is mounted, being secured to said shaft by a nut and feather, and at the bottom of the same shaft the feed-driving pinion O is similarly secured.

From motives of convenience, the lower bearing for the shaft C is made in a thimble, $b'$, which is fitted to the step-socket $b$, Figs. 3 and 5. This thimble is larger in diameter than the pinion O, and, therefore, when the saw has been removed and the ring A, the shaft C and all its remaining attachments may be lifted out together.

The shaft C, it will now be perceived, forms the axis of motion for the saw and its principal driving-wheels, and also for the primary driving-wheel for the feed-train.

The upper portion, $g$, of the hub of the wheel L is formed with cogs, to make a driving-pinion for the gear-wheels H H', though it may be more economical to form said pinion $g$ separately, and unite it with the wheel L by steady-pins or other devices. The great wheel M has an internal gear-rim, which, when in position, is opposite the pinion $g$, and the gear-wheels H H' mesh with said pinion on their inner sides, and with the great wheel on their outer sides, and so communicate motion from the wheel L to great wheel and main shaft.

The arrangement of two gear-wheels upon opposite sides of the pinion $g$ and great wheel M serves to balance the application of power and prevent unequal friction upon the bearing.

The saw N is composed of a series of steel serrated blades, $k$, and an iron disk, to the edge of which they are bolted, as shown in Fig. 10.

This method of construction is preferred on account of cheapness and the facility with which a broken portion may be removed and a fresh plate put in its place.

The saw and its operative mechanism have now been described, and it appears evident that the fingers to be slotted may be presented to the edge of the saw by a great variety of devices. I have provided, however, devices by means of which they may be presented as indicated above, and said devices will now be described.

The circular table P is provided with a suitable hub, and is fitted to the outer surface of the hub D in such a way that it may turn freely and truly thereon. Upon the upper surface of the table P is a series of radial grooves, $p$, with dovetail cross-section and parallel sides, and in these grooves the guard-finger holders are fitted to move to and from the center. The periphery of the table P is cut with cog-teeth, as shown in Fig. 8, and a rotation of said table is produced by the feed-train, which connects it with the pinion O. Said feed-train is composed of the reducing wheel and pinion J, driving the secondary reducing wheel and pinion Q R, the latter of which meshes with the cog-rim of the table P. The wheel J is conveniently mounted upon the lower end of the stationary shaft I.

As it is sometimes necessary to stop the feed without stopping the machine, I have mounted the wheel Q with a friction-connection only upon the connecting-shaft S, which is mounted in boxes $s\ s$, secured to the side of the case of the machine.

Said friction connection is secured as follows: At the lower end of the shaft S a conical head, $q$, is formed, and the hub of the wheel Q is bored to fit said cone. The shaft S is hollow, and a straining-rod, $r$, passes through its entire length, and is connected with a large flat head, $i$, below the wheel Q, and a hand-nut wheel, T, at the upper end of the shaft. When the feed-table P is in motion the wheel Q is drawn up in frictional contact with the head $q$ by the nut T and straining-rod $r$, and when it is desired to stop the feed it is only necessary to relax the straining-rod, and the wheel Q, by its own weight, will fall away from the head $q$, and may then revolve without communicating its motion to the shaft S and table P.

The guard-finger holder U consists of a solid block, fitted at its lower side to slide in the grooves $p$, and on its upper side it is fashioned to receive two guard-fingers. A clamp-plate, $u$, against which the finger is forced by bolts from the lower side of the block U, secures the guard-fingers in place. When the holder is placed in the groove $p$ the saw N is in position to pass just above the surface of the plate $u$, so as to attack the shoulder of the guard-finger at the proper point, as shown in Fig. 12. Various means can be employed to move the holders along the grooves $p$ toward the saw; but the device shown and described is simple and efficacious, and it has therefore been adopted.

I have before indicated as one of the objects of my invention the continuous operation of the saw upon a number of fingers, and the insertion and removal of the guards at the same part of the machine. To accomplish these purposes, the fingers are presented in radial direction to different parts of the edge of the saw, and the feeding-table is rotated so that the finished finger returns to the point where it was inserted as a blank finger.

In connection with the above contrivance, the simplest possible means of producing a regular and continuous feed is by a stationary scroll, against which the finger-holder will run and be continually pushed nearer to the center of the saw. I therefore place upon the top of the casing A a cap, V, with a circular orifice fitting the shoulder of the table P above the cog-rim, and provide said cap with a scroll-flange, W. This flange is not continuous around the entire periphery of the feed-table; but a space is left between the two ends about equal to the space occupied by two of the grooves $p$ and the intervening portions of the feed-table, and this is sufficient for the removal and replacement of the finger-holders without stopping the machine.

The guard-finger holder U is provided with a friction-roller, $k$, which travels along the scroll W, and said friction-rollers are made adjustable by means of the bar $m$, which passes through the holder U, and is provided with adjusting-nuts at each side of said holder, as shown in Figs. 11, 12, 13. This adjustment is required to compensate for the wearing away and decrease in the diameter of the saw consequent upon continuous use.

The operation of this machine is very simple, and requires but little description. It is necessary to provide a few extra finger-holders, so that when one is removed from the machine another with blanks may be ready for insertion. The time intervening between the insertion of one holder and the removal of the next is sufficient for the removal of the slotted fingers and the replacement of blank fingers in their place, so that no time need be lost by the machine. The uniform pressure upon the edge of the saw from all sides reduces the friction at the arbor, and materially increases the effective power of the machine.

Having described my invention, what I claim as new is—

1. In combination with the circular saw and mechanism to rotate the same, the series of guard-finger holders arranged upon a table and at intervals around the periphery of the saw, and mechanism to force simultaneously all of the holders of said series, and with them the fingers held by them, up toward the edge of the saw, substantially as described.

2. In combination with the circular saw and mechanism to rotate the same, the series of guard-finger holders arranged at intervals around the periphery of said saw, and mechanism to revolve said series of holders around the saw, and simultaneously therewith to gradually force all the holders of said series toward, and the blanks held by them severally against, the teeth of the saw, substantially as described.

3. In combination with the circular saw and mechanism to rotate the same, the series of guard-finger holders arranged upon a table and at intervals around the periphery of said saw, and mechanism to rotate said table, and to gradually force, simultaneously therewith, all of the holders of said series, and with them the fingers held by them, up toward the edge of the saw, substantially as described.

4. The combination of the circular saw and mechanism to rotate the same, and the series of guard-finger holders, arranged at intervals around said saw, with the mechanism by means of which said guard-finger holders are first forced simultaneously toward the edge of the saw, and then successively released from the action of said mechanism, substantially as described.

5. In combination with the saw-rotating feed-table P and the guard-finger holders, the spiral or scroll flange W, or its equivalent, as set forth.

6. In combination with the guard-finger holder U, the adjustable bar $m$ and friction-roller $k$, to regulate the depth of the cut and to reduce friction, as set forth.

7. The arrangement of gearing which communicates motion to the saw and to the table P, substantially as described.

JEROME FASSLER.

Witnesses:
WILLIAM T. STILWELL,
WM. N. WHITELY.